(12) United States Patent
Jiran et al.

(10) Patent No.: US 11,073,205 B2
(45) Date of Patent: Jul. 27, 2021

(54) SHIFT LEVER ASSEMBLY WITH POSITION SENSING

(71) Applicant: Dura Operating, LLC, Auburn Hills, MI (US)

(72) Inventors: Joseph D. Jiran, Fremont, MI (US); Dale A. Beattie, Norton Shores, MI (US); Alberto Polonio, West Bloomfield, MI (US)

(73) Assignee: DUS OPERATING INC., Auburn Hills, MI (US)

( * ) Notice: Subject to any disclaimer, the term of this patent is extended or adjusted under 35 U.S.C. 154(b) by 193 days.

(21) Appl. No.: 16/370,103

(22) Filed: Mar. 29, 2019

(65) Prior Publication Data
US 2020/0309252 A1 Oct. 1, 2020

(51) Int. Cl.
| | |
|---|---|
| *F16H 59/02* | (2006.01) |
| *F16H 61/22* | (2006.01) |
| *F16H 59/44* | (2006.01) |
| *F16H 63/42* | (2006.01) |
| *F16H 59/10* | (2006.01) |

(52) U.S. Cl.
CPC ..... *F16H 59/0204* (2013.01); *F16H 59/0278* (2013.01); *F16H 59/105* (2013.01); *F16H 59/44* (2013.01); *F16H 61/22* (2013.01); *F16H 63/42* (2013.01); *F16H 2059/0282* (2013.01); *F16H 2063/423* (2013.01)

(58) Field of Classification Search
CPC ............. F16H 59/0204; F16H 59/0278; F16H 59/105; F16H 59/44; F16H 61/22; F16H 63/42; F16H 2059/0282; F16H 2063/423
See application file for complete search history.

(56) References Cited

U.S. PATENT DOCUMENTS

| | | | |
|---|---|---|---|
| 4,022,078 A | 5/1977 | Malott | |
| 4,519,266 A | 5/1985 | Reinecke | |
| 4,610,179 A * | 9/1986 | Parker | F16H 59/08 200/61.88 |
| 4,660,430 A | 4/1987 | Bortfeld et al. | |
| 4,853,629 A | 8/1989 | Rops | |
| 5,009,128 A * | 4/1991 | Seidel | F16H 63/42 340/456 |
| 5,307,013 A | 4/1994 | Santos et al. | |
| 6,154,107 A * | 11/2000 | Tomotoshi | F16H 59/105 200/61.88 |

(Continued)

FOREIGN PATENT DOCUMENTS

| | | |
|---|---|---|
| DE | 10231015 A1 | 3/2004 |
| DE | 102006021078 B3 | 8/2007 |

(Continued)

*Primary Examiner* — David M Fenstermacher
(74) *Attorney, Agent, or Firm* — Vivacqua Crane

(57) ABSTRACT

In at least some implementations, a vehicle shift lever assembly includes a shift lever movable about a first pivot axis within a first shift path having multiple shift positions, and movable about a second pivot axis to a second shift path having at least one shift position, and the second pivot axis is not parallel to the first pivot axis, and a sensor element coupled to the shift lever for movement with the shift lever. The sensor element is oriented in a different position when the shift lever is in each of the shift positions in the first shift path and each of the shift positions of the second shift path.

18 Claims, 9 Drawing Sheets

(56) References Cited

U.S. PATENT DOCUMENTS

| | | | |
|---|---|---|---|
| 6,431,339 B1 * | 8/2002 | Beattie | F16H 59/0204 |
| | | | 192/220.4 |
| 6,448,670 B1 | 9/2002 | Onodera et al. | |
| 6,485,340 B1 | 11/2002 | Kolb et al. | |
| 6,508,139 B2 * | 1/2003 | Onodera | F16H 59/105 |
| | | | 74/335 |
| 6,547,696 B2 * | 4/2003 | Syamoto | B60R 25/063 |
| | | | 477/99 |
| 6,550,351 B1 | 4/2003 | O'Reilly et al. | |
| 6,659,255 B2 * | 12/2003 | Syamoto | F16H 61/22 |
| | | | 192/220.4 |
| 6,761,081 B2 * | 7/2004 | Kliemannel | F16H 59/044 |
| | | | 74/335 |
| 6,848,331 B2 * | 2/2005 | Syamoto | F16H 59/0204 |
| | | | 74/473.18 |
| 7,334,497 B2 | 2/2008 | Giefer et al. | |
| 7,430,938 B2 | 10/2008 | Giefer et al. | |
| 7,571,661 B2 | 8/2009 | Blondeel et al. | |
| 7,726,215 B2 | 6/2010 | Giefer et al. | |
| 7,784,375 B2 | 8/2010 | Bleckmann et al. | |
| 8,253,409 B2 | 8/2012 | Kitanaka et al. | |
| 8,485,061 B2 | 7/2013 | Kliemannel et al. | |
| 8,490,509 B2 | 7/2013 | Giefer et al. | |
| 8,521,376 B2 | 8/2013 | Katrak et al. | |
| 8,752,448 B2 | 6/2014 | Giefer et al. | |
| 8,760,152 B2 | 6/2014 | Uhlenbruck | |
| 9,027,428 B2 * | 5/2015 | Iwata | G01B 7/003 |
| | | | 74/473.12 |
| 9,239,248 B2 | 1/2016 | Zwijze et al. | |
| 9,435,425 B2 | 9/2016 | Heo et al. | |
| 9,529,378 B2 * | 12/2016 | Jeon | F16H 59/10 |
| 10,088,039 B2 | 10/2018 | Kim | |
| 10,107,388 B2 * | 10/2018 | Beattie | F16H 59/105 |
| 10,281,028 B2 * | 5/2019 | Recio | F16H 59/105 |
| 2002/0002849 A1 | 1/2002 | Syamoto et al. | |
| 2007/0034041 A1 | 2/2007 | Dominguis Botella et al. | |
| 2008/0072698 A1 | 3/2008 | Hirano | |
| 2008/0098849 A1 | 5/2008 | Wang | |
| 2010/0307276 A1 | 12/2010 | Giefer et al. | |
| 2011/0005344 A1 | 1/2011 | Haevescher | |
| 2011/0277578 A1 | 11/2011 | McGuire et al. | |
| 2012/0144949 A1 | 6/2012 | Kim et al. | |
| 2012/0187940 A1 | 7/2012 | Uhlenbruck | |
| 2013/0255423 A1 | 10/2013 | Gill et al. | |
| 2016/0069450 A1 | 3/2016 | Uhlenbruck | |
| 2016/0290495 A1 | 10/2016 | Bak et al. | |
| 2016/0319929 A1 | 11/2016 | Kim | |
| 2018/0238440 A1 | 8/2018 | Brück et al. | |

FOREIGN PATENT DOCUMENTS

| | | |
|---|---|---|
| DE | 102009015883 A1 | 10/2010 |
| JP | 2007045390 A | 2/2007 |
| WO | WO2010026947 A1 | 3/2010 |
| WO | WO2011061223 A1 | 5/2011 |
| WO | WO2015033322 A2 | 3/2015 |

* cited by examiner

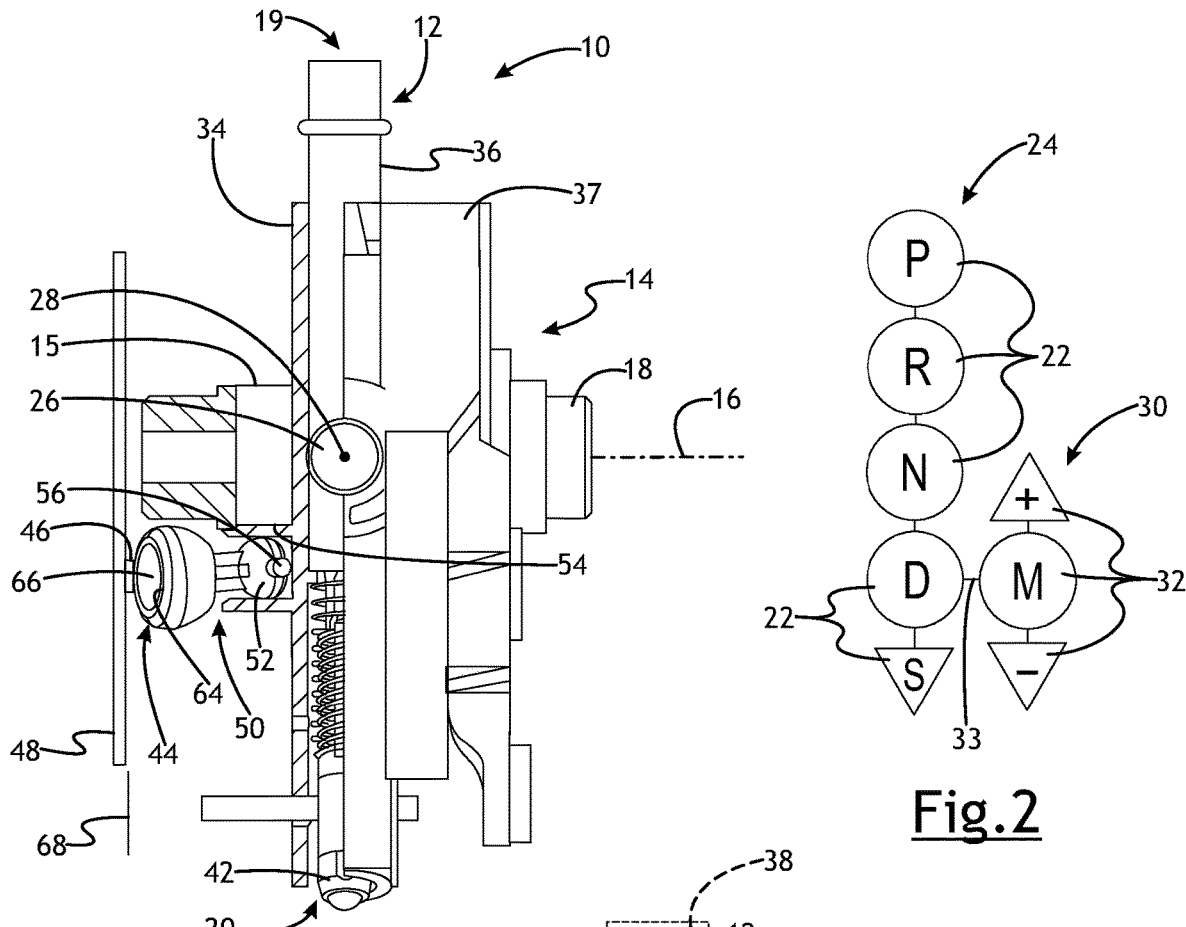
Fig.1
Fig.2
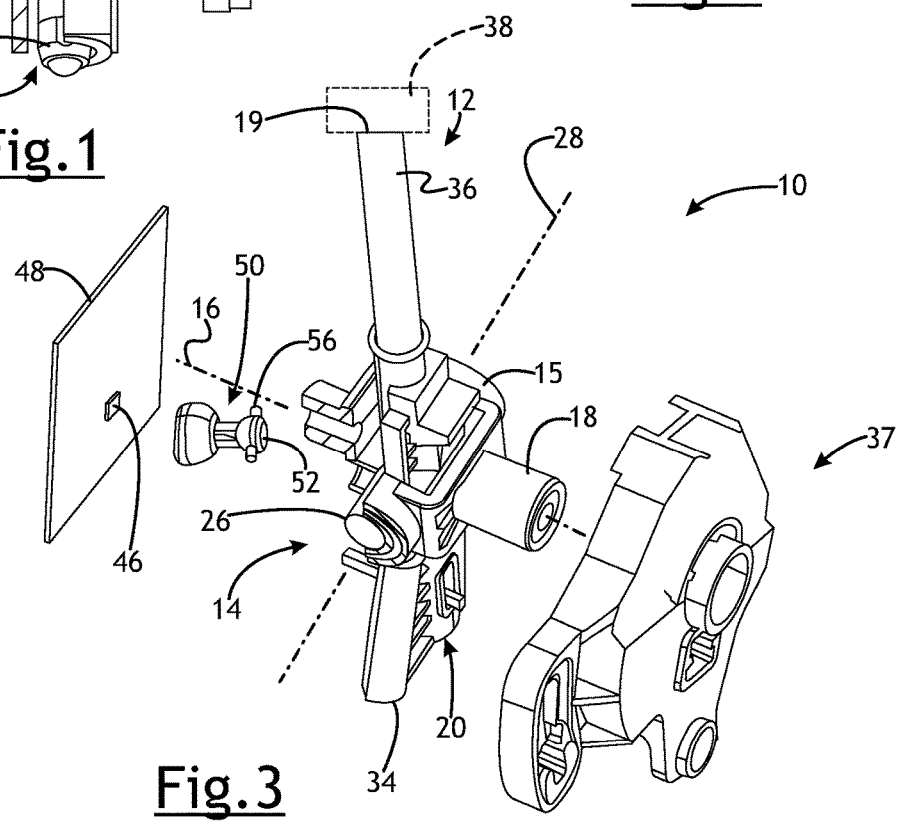
Fig.3

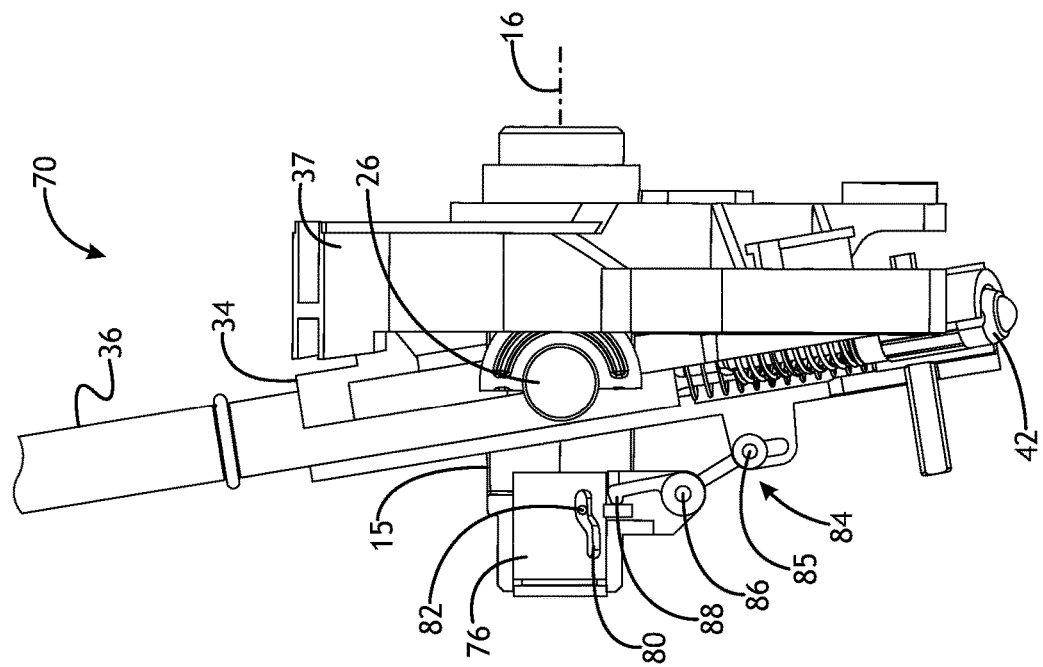
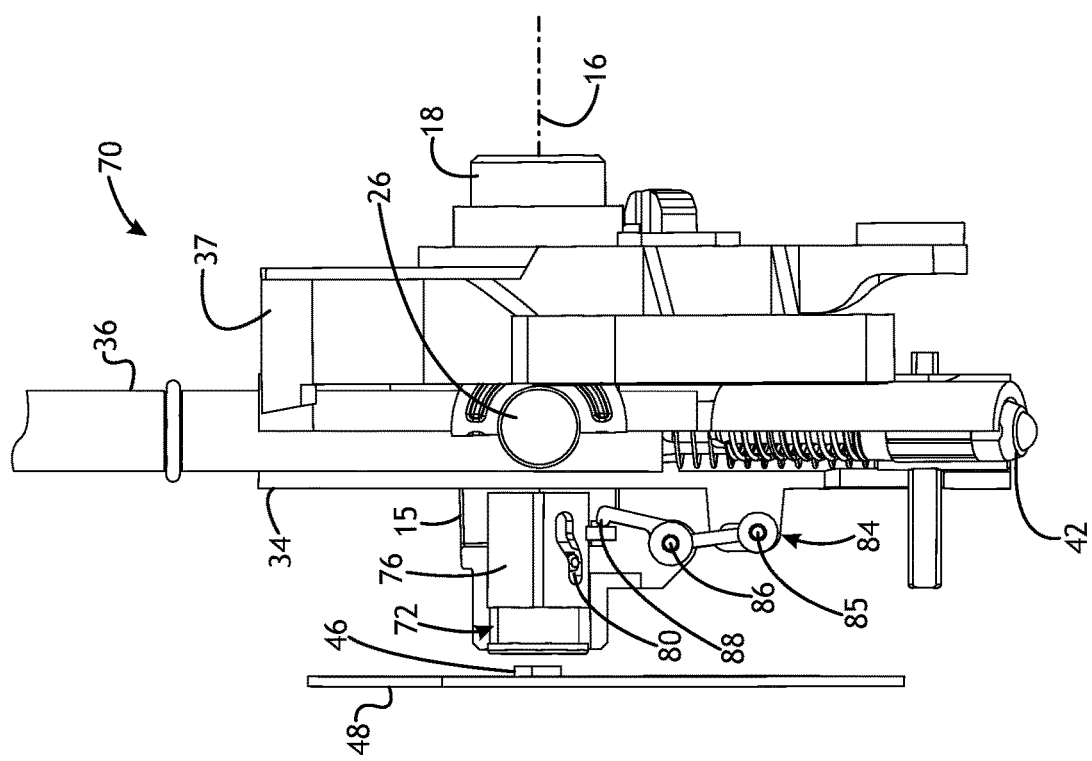

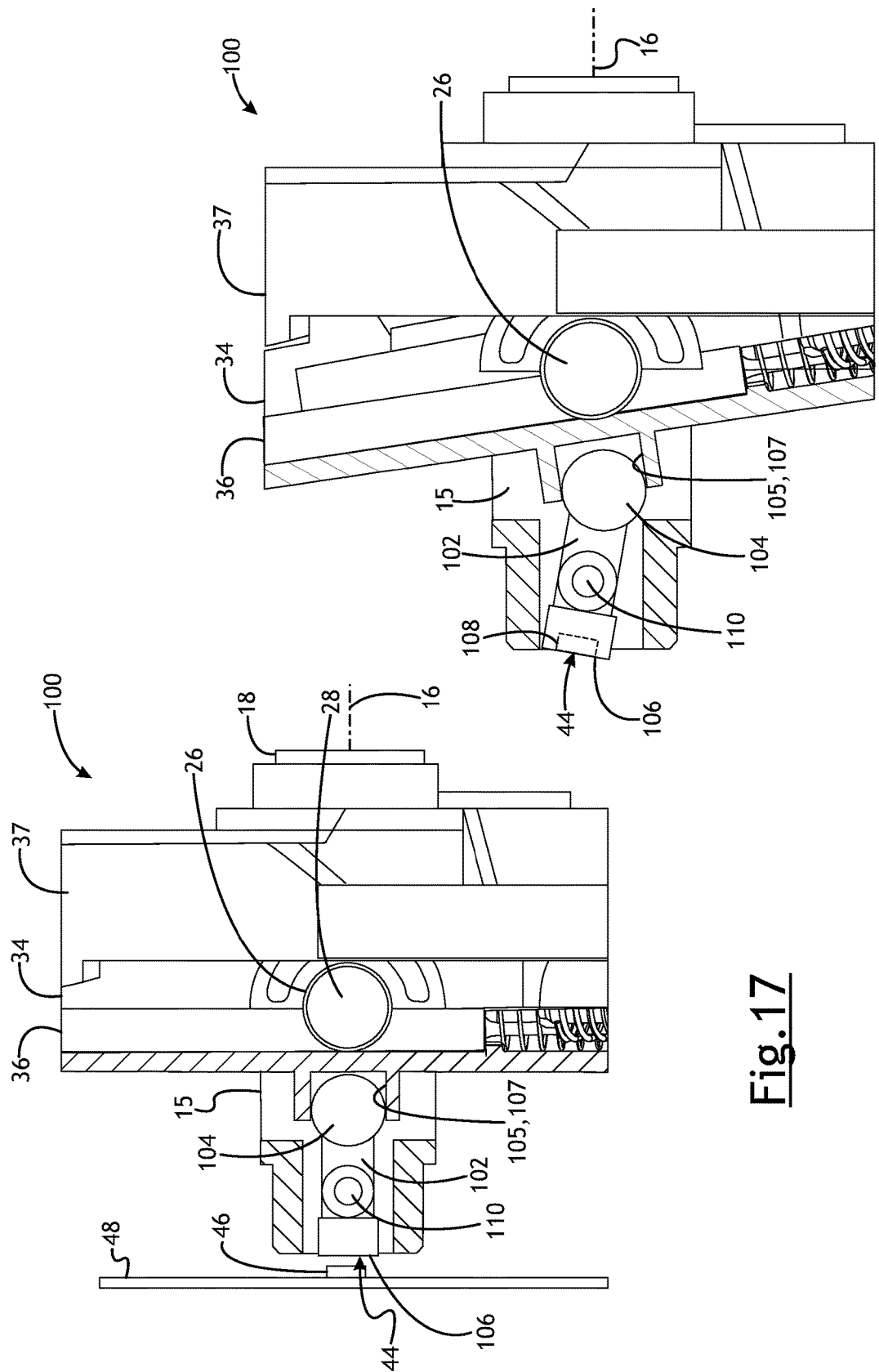

SHIFT LEVER ASSEMBLY WITH POSITION SENSING

TECHNICAL FIELD

The present disclosure relates generally to a shift lever for a vehicle transmission, and to determining or sensing different positions of the shift lever.

BACKGROUND

In some vehicles, a gear shift lever in a passenger compartment of the vehicle can be moved by an operator of the vehicle to shift the vehicle transmission between its park gear and other gears, such as reverse, neutral and forward drive gears. The shift lever is mechanically coupled to the transmission through a cable that transmits the shift lever movement to a transmission shift mechanism.

Other vehicles use a so-called "shift-by-wire" system wherein an operator shift lever or shift control unit is not physically coupled to the transmission shift mechanism by a cable. Instead, the shift control unit is electrically coupled to a shift actuator that is arranged to shift the transmission upon receipt of a signal from the shift control unit that a transmission gear shift is desired by the operator.

SUMMARY

In at least some implementations, a vehicle shift lever assembly includes a shift lever movable about a first pivot axis within a first shift path having multiple shift positions, and movable about a second pivot axis to a second shift path having at least one shift position, and the second pivot axis is not parallel to the first pivot axis, and a sensor element coupled to the shift lever for movement with the shift lever. The sensor element is oriented in a different position when the shift lever is in each of the shift positions in the first shift path and each of the shift positions of the second shift path.

In at least some implementations, the sensor element is rotated about an axis and the sensor element is in a different rotary orientation in each shift position. The axis about which the sensor element is rotated may be parallel to the pivot axis.

In at least some implementations, the sensor element is carried by a link and the link and sensor are rotated about a first axis during at least some movement of the shift lever between two of said shift positions. And the link may be rotated about a pivot during movement of the shift lever between at least two of said shift positions. The link may be rotated about the pivot when the shift lever moves from a shift position in the first path to a shift position in the second path. In at least some implementations, the link rotates about the pivot in a manner that is not parallel to the first pivot axis. The pivot may be coupled to the link and to the shift lever, and the link may pivot relative to the shift lever. In at least some implementations, the pivot is coupled to a mount body to which the shift lever is coupled, and the mount body moves with the shift lever about the first pivot axis and the shift lever moves relative to the mount body about the second pivot axis. The shift lever may engage the link and move the link about the pivot when the shift lever moves about the second pivot axis. The shift lever may engage the link and move the link about the pivot when the shift lever moves about the second pivot axis. And the shift lever may slidably move relative to the link when the shift lever moves about the second pivot axis.

In at least some implementations, a drive member is coupled to the shift lever and a driven member is coupled to the sensor element. Movement of the shift lever about the second pivot axis moves the drive member relative to the driven member and rotates the driven member to rotate the sensor element. The drive member may move relative to the driven member along a drive axis as the shift lever is moved about the second pivot axis, and the sensor element may rotate about the drive axis, and the drive axis may be coincident with the first pivot axis.

In at least some implementations, a vehicle shift lever assembly includes a shift lever movable about a first pivot axis within a first shift path having multiple shift positions, and about a second pivot axis to a second shift path having at least one shift position, wherein the second pivot axis is not parallel to the first pivot axis, and a sensor element is coupled to the shift lever for movement with the shift lever. The sensor element is oriented in a different position when the shift lever is in each of the shift positions in the first shift path and each of the shift positions of the second shift path. And a sensor element is spaced from the shift lever and responsive to movement of the sensor element that is coupled to the shift lever.

In at least some implementations, a circuit board is included and the sensor element spaced from the shift lever is mounted on the circuit board and wherein the circuit board is mounted perpendicular to the first shift axis. The sensor element coupled to the shift lever may move in a path that is perpendicular to the first pivot axis when the shift lever moves in the first shift path.

In at least some implementations, the sensor element coupled to the shift lever is coaxial with the first pivot axis at least when the shift lever is within the first shift path. In at least some implementations, a link is coupled to the shift lever and which carries the sensor element that is coupled to the shift lever, and wherein the link is pivoted about an axis that is not parallel to the first pivot axis when the shift lever moves about the second pivot axis.

In at least some implementations, a mount body moves with the shift lever about the first pivot axis, and the shift lever moves relative to the mount body when the shift lever moves about the second pivot axis.

As will be appreciated from the above summary description and the following more detailed description, the various features may be used in any desired combination including one, more than one or all of the features noted herein, to the extent such features are not mutually exclusive. The disclosure herein is not intended to be limited to any particular combination of features, nor to limit the possible combinations, except as set forth in the appended claims.

BRIEF DESCRIPTION OF THE DRAWINGS

The following detailed description of some implementations of a shifter will be set forth with regard to the accompanying drawings, in which:

FIG. 1 is a front and partially sectioned view of a shift lever assembly including a shift lever, a sensor element carried by the shift lever, a circuit board, and a sensor element mounted on the circuit board;

FIG. 2 is a schematic view of two shift paths including multiple positions to which the shift lever can be moved;

FIG. 3 is an exploded and partially sectioned view of the assembly;

FIG. 13 is a front and partially sectioned view of the assembly in a position corresponding to a shift position in the first shift path;

FIG. 14 is a front and partially sectioned view of the assembly in a position corresponding to a shift position in the second shift path;

FIG. 17 is a front and partially sectioned view of the assembly of FIG. 16 in a position corresponding to a shift position in the first shift path; and FIG. 18 is a front and partially sectioned view of the assembly of FIG. 16 in a position corresponding to a shift position in the second shift path.

DETAILED DESCRIPTION

Figure 5:
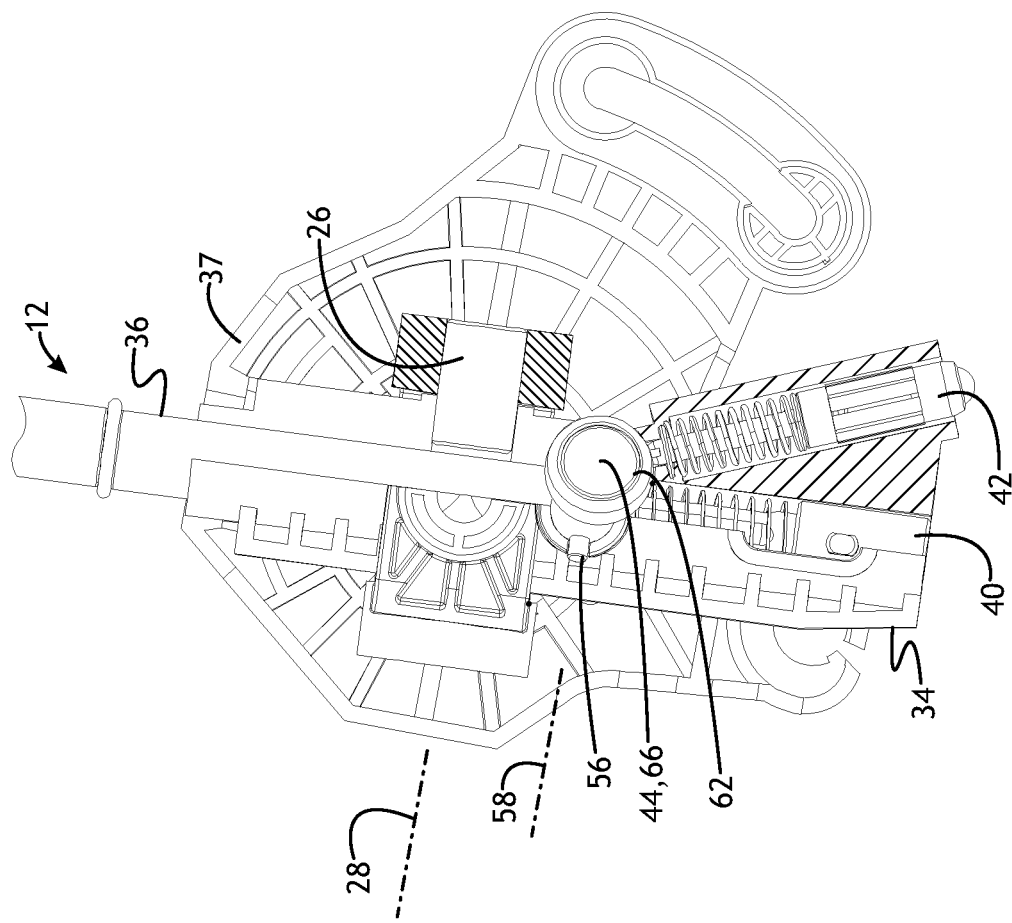
FIG. 5 is a side and partially sectioned view of the assembly in the position of FIG. 4.
Figure 4:
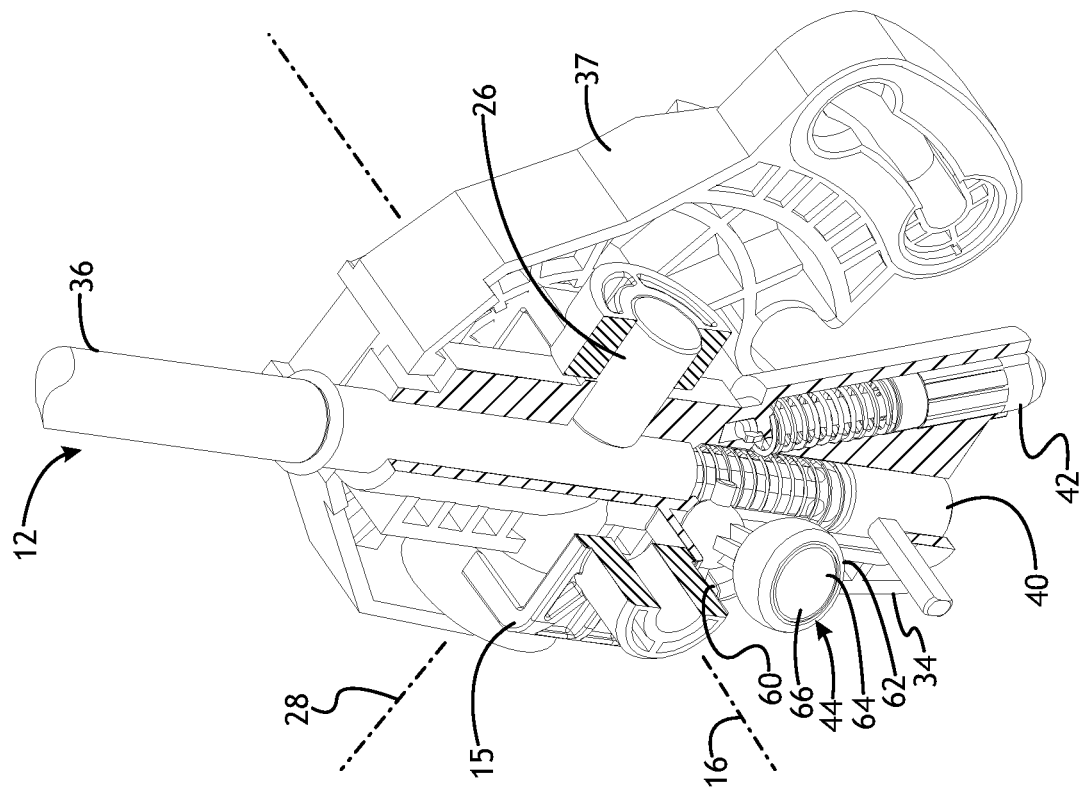
FIG. 4 is a perspective and partially sectioned view of the assembly in a position corresponding to a first shift position of the first shift path.
Figure 7:
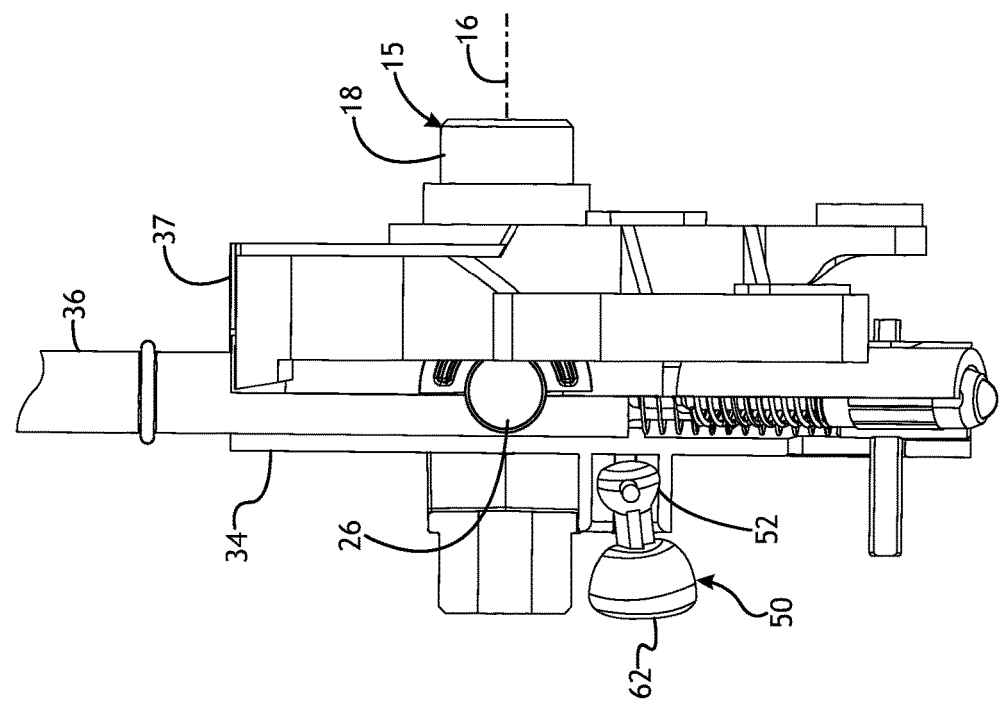
FIG. 7 is a front and partially sectioned view of the assembly in the position of FIG. 6.
Figure 6:
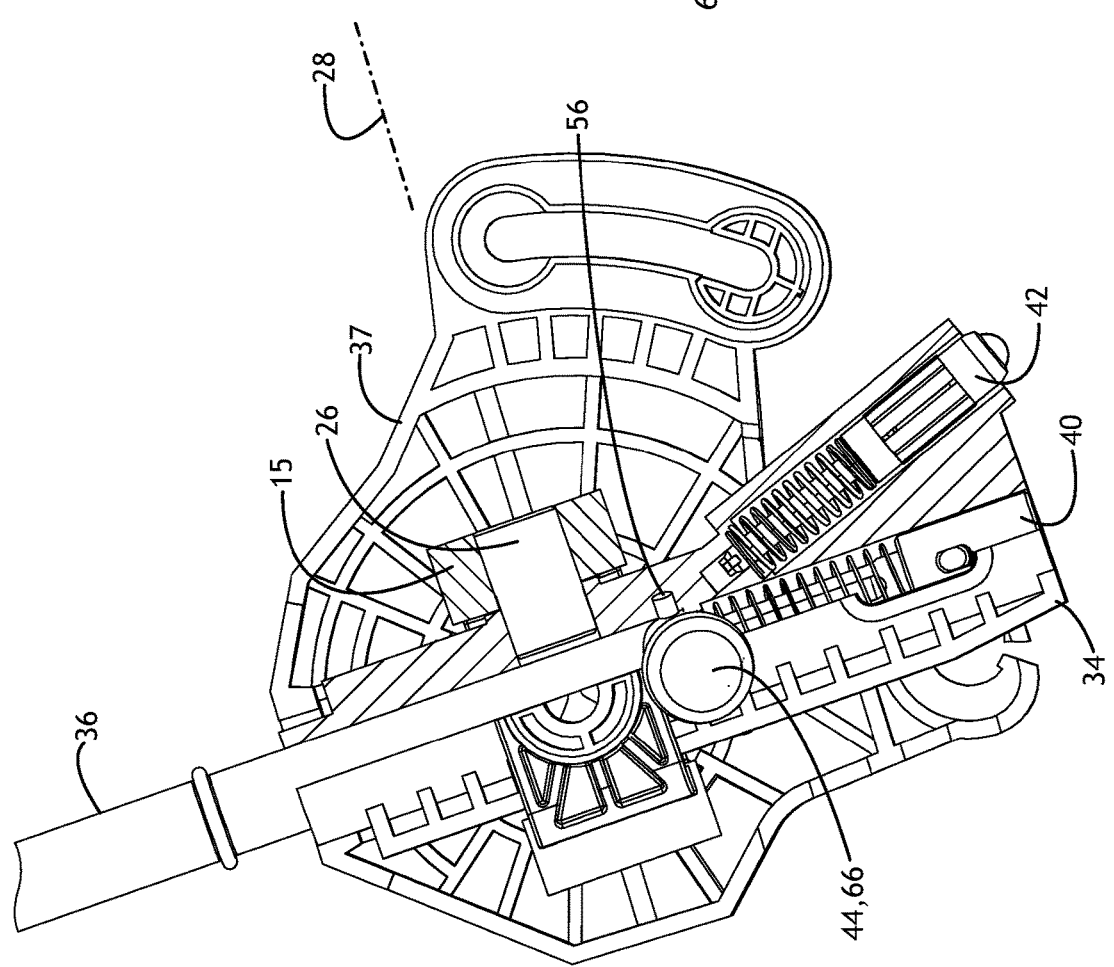
FIG. 6 is a side and partially sectioned view of the assembly in a different position corresponding to a different shift position in the first shift path.
Figure 9:
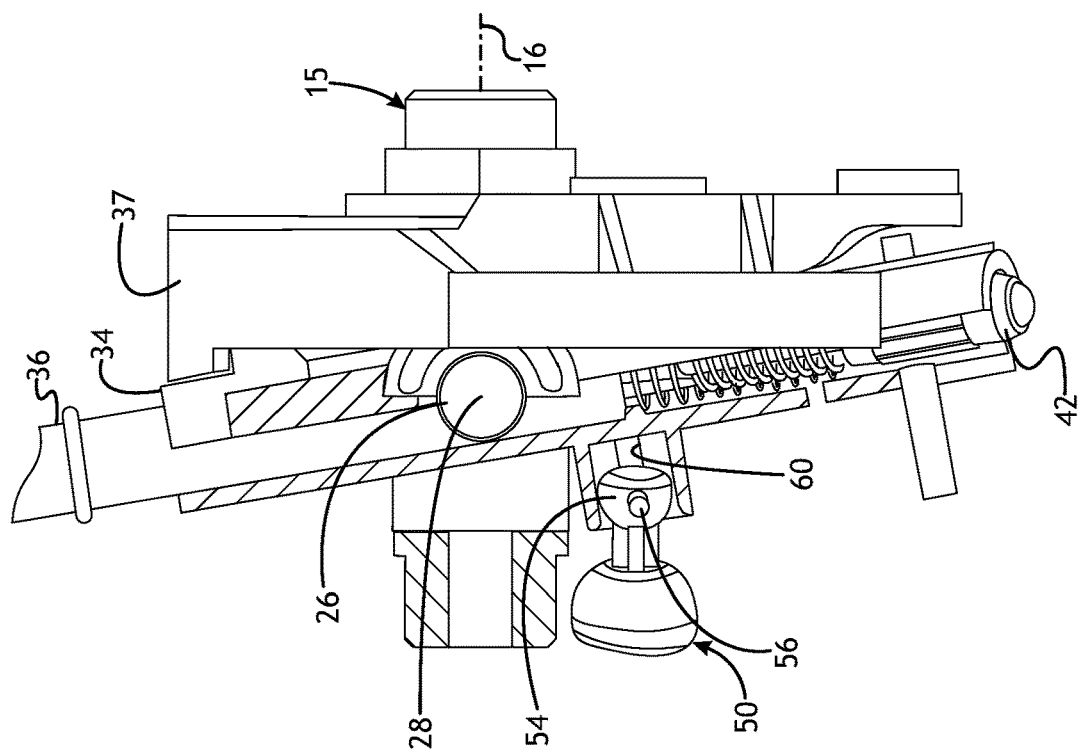
FIG. 9 is a front and partially sectioned view of the assembly in the position of FIG. 8.
Figure 8:
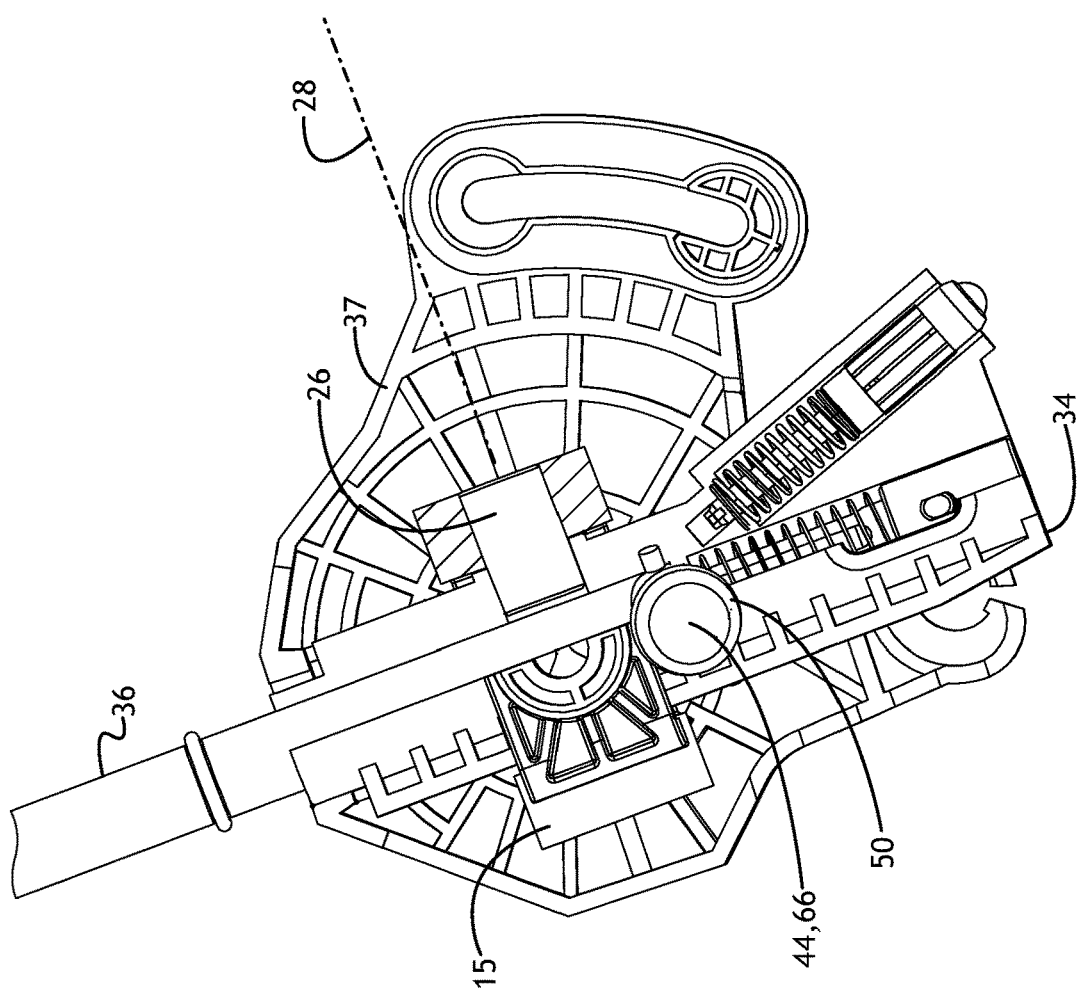
FIG. 8 is a side and partially sectioned view of the assembly in a position corresponding to a shift position in the second shift path.
Figure 11:
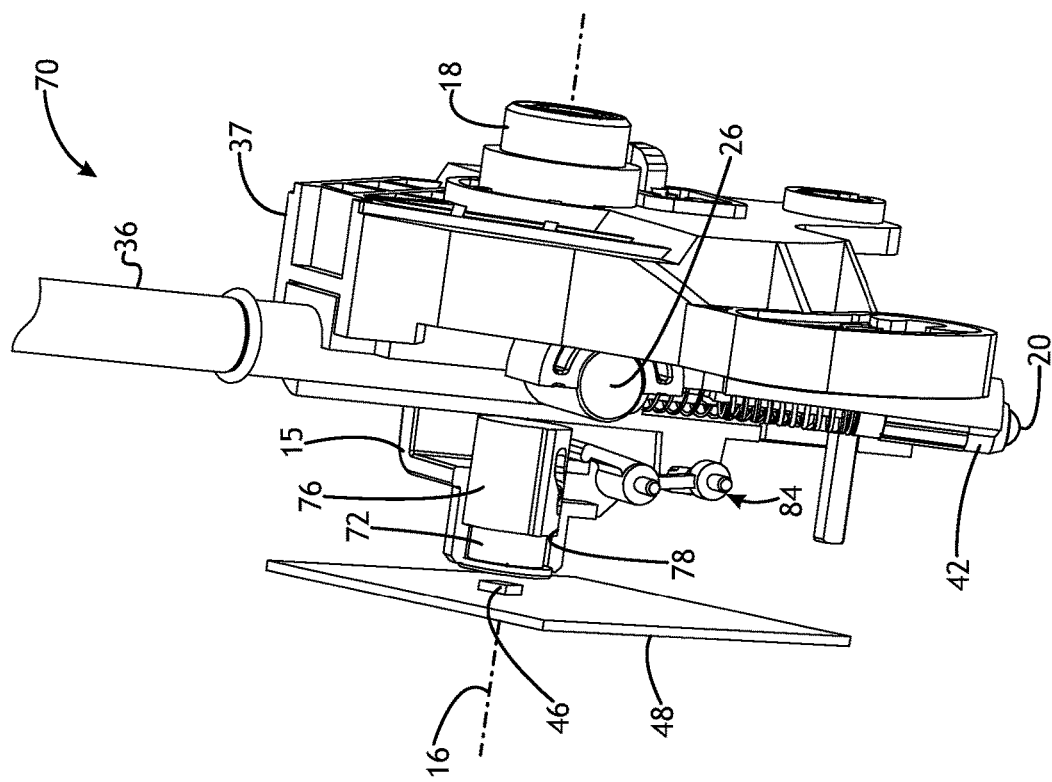
FIG. 11 is a perspective and partially sectioned view of the assembly of FIG. 10.
Figure 10:
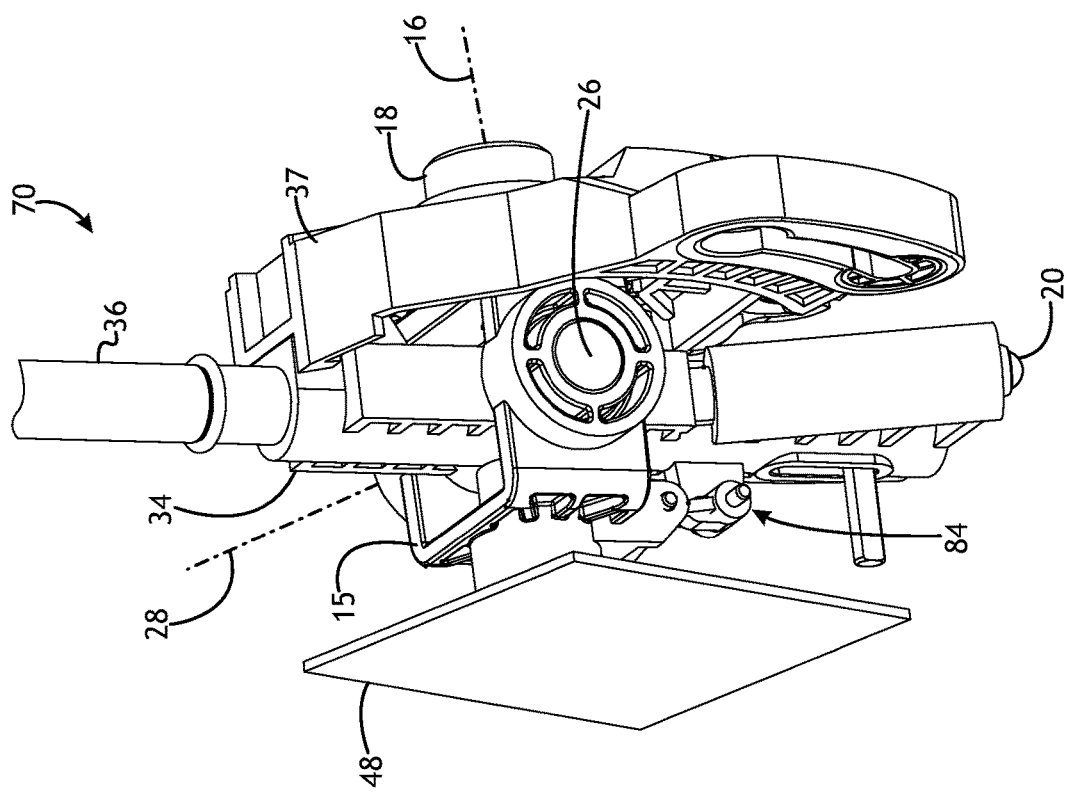
FIG. 10 is a perspective view of a shift lever assembly movable in two shift paths and including sensor elements for tracking the shift lever position.
Figure 12:
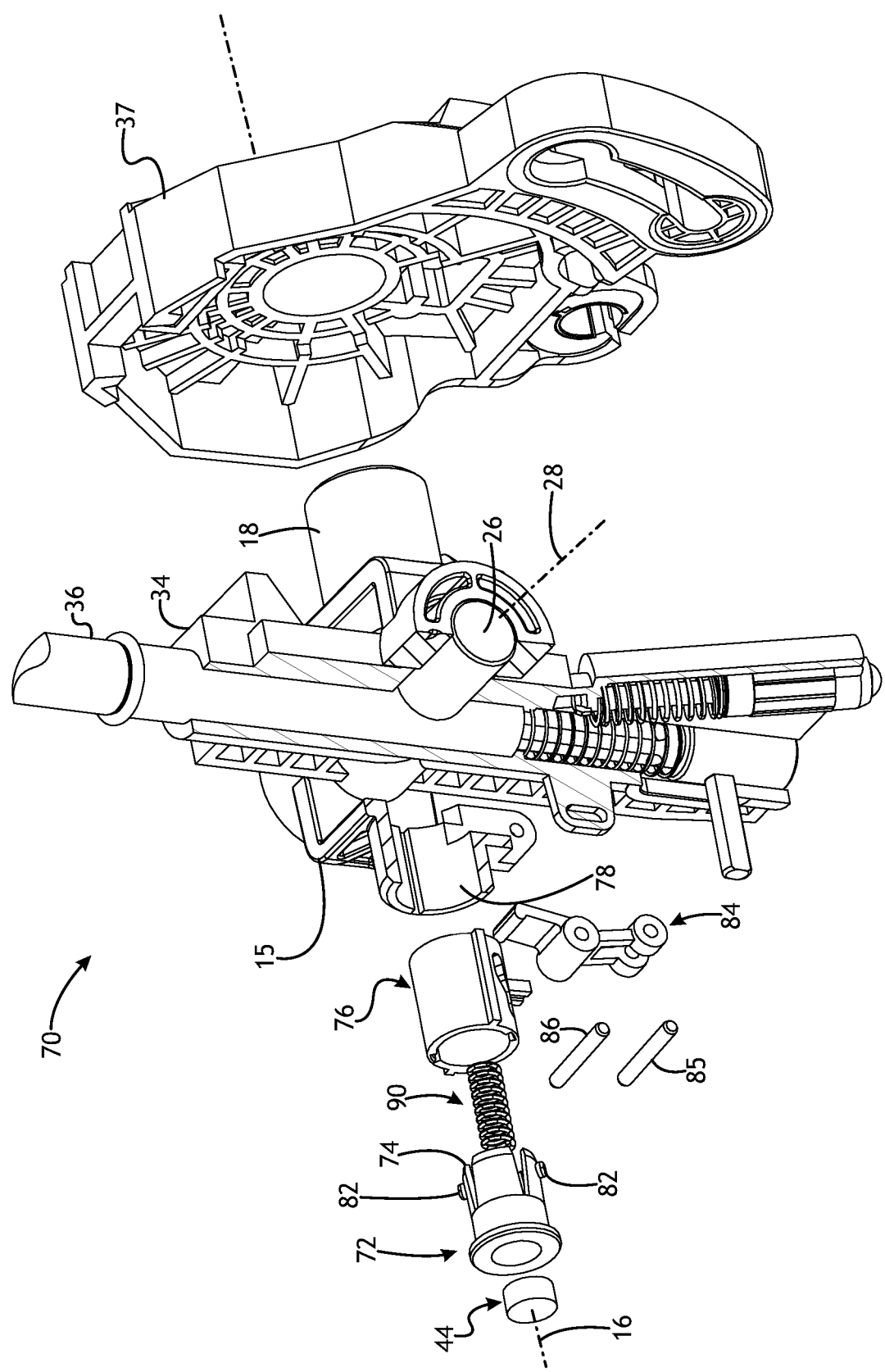
FIG. 12 is an exploded and partially sectioned view of the assembly of FIG. 10.

Referring in more detail to the drawings, FIG. 1 shows a vehicle shift lever assembly 10 that may be used to change a mode of a vehicle transmission (e.g. cause a transmission gear change). The assembly 10 includes a gear shift lever 12 that may be moved to shift the transmission among various modes, typically including park, neutral, reverse and forward drive gears. The shifting system of which the shift lever assembly 10 may include a cable mechanically coupled to a transmission shift actuator to directly move the shift actuator, or may be a so-called "shift by wire" system where an operator command for a gear shift is electrically transmitted to the shift actuator to cause the actuator to shift the transmission.

In at least some implementations, the shift lever assembly 10 may include or be coupled to a mount 14 that is connected to the vehicle. The mount 14 as shown includes a pivot body 15 that may be coupled to a housing of the assembly or other structure of the vehicle. The lever 12 is coupled to the pivot body 15 and both the shift lever and pivot body are rotatable about a first pivot axis 16 of a first pivot 18 which may be defined by a pin, post or the like, and may be located between the ends 19, 20 of the shift lever 12. Rotation of the shift lever 12 about the first pivot 18 moves the shift lever 12 among and between a plurality of shift positions 22 arranged along a first shift path 24. As shown in FIG. 2, the first shift path 24 in the illustrated implementation includes shift positions 22 that correspond to park, reverse, neutral, drive and sport gears or modes of the transmission (respectively labeled P, R, N, D and S in FIG. 2).

The shift lever 12 is also pivotably coupled to the pivot body 15, such as by a post or pin 26, so that the shift lever 12 can pivot or rotate relative to the pivot body 15 about a second pivot axis 28. Pivoting of the shift lever 12 about the second pivot axis 28 moves the shift lever from the first shift path 24 to a second shift path 30 which may have one or more shift positions 32 separate from the first shift path 24. In the example shown in FIG. 2, the second shift path 30 is connected to the first shift path by a connecting passage 33 and is associated with a manual shifting mode in which movement of the shift lever 12 about the first pivot axis 16 in a first direction causes a transmission upshift and movement of the shift lever 12 about the first pivot axis 16 in an opposite, second direction causes a transmission downshift.

In the implementation shown, the shift lever 12 includes a support body 34, a rod 36 extending from the support body 34, and may also include a coupling body 37 to which a cable may be connected for shifting the transmission. The rod 36 may have a free end defining end 19 of shift lever 12 and adapted to receive a handle or knob 38 (shown in dashed lines in FIG. 2) that the driver grasps and applies force to in order to pivot the shift lever 12 and cause a gear change, as set forth in more detail below. The support body 34 may be mount or carry any one or more components of the assembly 10, such as a movable body 40 that permits selective locking of the shift lever 12 (e.g. a park lock that prevents shifting out of park unless some other action is taken, such as a brake pedal being depressed) and a detent follower 42. The detent follower 42 moves within a track that may be formed in an adjacent component having a plurality of recesses in which the follower 42 may be received, with a recess associated with a shift position 22 or 32 so that when the follower 42 is received in a recess, the shift lever 12 may be releasably retained in a selected position. As the follower 42 moves among the recesses, forces may be transmitted to a driver through the shift lever 12 and with this tactile feedback, the driver can better distinguish among the various shift lever positions.

The shift lever 12 may also be associated with or carry one or more sensor elements, shown as a single sensor element 44 in the illustrated implementation. The sensor element(s) 44 permit(s) sensing and determination of movement of the shift lever 12 and/or when the shift lever 12 is in the various shift positions 22, 32, and that information can be used to cause the shift actuator to shift the transmission to a selected drive mode or gear.

There are different ways to generate an electrical signal to monitor or detect shift lever position and communicate the signal with a control unit to actuate the shift actuator to a desired drive mode or gear. As an example, a pair of sensor elements may include a transmitter that transmits or provides a detectable signal or the like, and a receiver that detects or receives the detectable signal. One or more sensor elements 44 may be attached to the shift lever 12, and one or more sensor elements 46 (FIGS. 1 and 3) may be mounted (e.g. on a printed circuit board (PCB) 48) in the area of the sensor element 44 and/or a path of movement of the sensor element 44. In such an arrangement, as the shift lever 12 is moved to cause a gear change, the sensor element 44 associated with the shift lever is moved relative to the mounted sensor element(s) 46. One or more sensor elements 44, 46 provide an output that corresponds to the shift lever position or movement and the sensor output is communicated with one or more controllers. In turn, the controller(s) is/are operable to control the shift actuator and cause a shift to occur corresponding to the drive mode selected by the driver. Of course, other arrangements may be implemented.

The sensor elements 44, 46 may include any complementary set of components in which the presence or motion of one of the elements may be detected by the other. In at least some implementations, the sensor element 44 includes or is defined by a magnet (FIG. 3) and the sensor element 46 includes a sensor that is responsive to or detect presence of a magnetic field, strength of the magnetic field, changes in the magnetic field or movement of the magnetic field. The sensor 46 may be a hall effect type sensor, hall effect switch or series of switches, reed switches or any other magnetically sensitive or responsive sensor. The sensor 46 may include one or more than one sensor or sensing element, switch or other element arranged along the path of movement of the magnet 44 as the shift lever 12 is pivoted. Of course, the sensor could also be moved relative to the magnet, or both could move relative to each other, if desired.

In the implementation shown, the magnet 44 is carried by the shift lever support body 34 for movement relative to the sensor 46 as the shift lever 12 is moved among the shift positions 22, 32. Hence, as the shift lever 12 moves, the magnet 44 is moved relative to the PCB 48 and sensor 46. In more detail, the magnet 44 is carried by a link 50 that is coupled to the support body 34, and the link 50 and support body 34 are arranged so that the magnet 44 is in a different position relative to the sensor 46 in each of the shift positions 22, 32 of the shift lever 12. In at least some implementations, the link 50 is coupled to the support body 34 at a location spaced from the first pivot axis 16 and, as the shift lever 12 moves about the first pivot axis 16, the link 50 moves with the support body 34 and the magnet 44 is moved along an arcuate path relative to the sensor 46. The magnet's path of movement is a function of how far the magnet 44 is spaced from the first pivot axis 16.

The link 50 may be slidably and pivotably carried by (e.g. coupled to) the support body 34 at a first end 52 of the link 50 which is received within a cavity 54 in the support body 34 (or a component carried by/connected to the support body which for this purpose may be considered to be part of the support body). To inhibit or prevent relative movement between the link 50 and support body 34 during at least some movement of the shift lever 12, a portion of the link 50, such as the first end 52, may be at least somewhat closely received in the cavity 54. That is, the link 50 may be overlapped by a wall or walls that define the cavity 54 and extend at a non-zero angle to (not parallel to) a path of movement of the shift lever 12. In at least some implementations, the link 50 and cavity 54 are arranged so that the link 50 moves with the shift lever 12 (and its support body 34) when the shift lever pivots about the first pivot axis 16. In other words, a dimension (which may be called the width) of a portion of the link 50 (e.g. the first end 52) measured perpendicular to the first pivot axis 16 may be about the same as the same dimension of the corresponding portion of the cavity 54.

In the example shown, the first end 52 of the link 50 may be rounded, such as partially or fully spherical, or otherwise shaped to permit the link 50 to rotate, such as by pivoting, swiveling or tilting, relative to the support body 34 about the first end 52 during certain movements of the shift lever 12, as set forth in more detail below. As shown in FIGS. 1 and 3-9 (although not separately labeled in each of those views), the link 50 may include or be mounted on a post or pin 56 that defines a pivot axis 58 (FIG. 5) of the link 50, about which the link 50 may rotate (e.g. pivot, swivel or tilt) relative to the support body 34. The pin 56 may be received within a slot 60 formed in the support body 34 that is open to the cavity 54. The slot 60 may extend at a non-zero angle (i.e. not parallel) and may be perpendicular to the second pivot axis 28, permitting relative movement between the support body 34 and the pin 56, as set forth in more detail below. To permit relative movement between the link 50 and the support body 34 when the shift lever 12 is moved about the second pivot axis 28, the corresponding dimension (which may be called the depth) of the cavity 54 may be larger than that of the link 50. In at least some implementations, the dimension of the cavity 54 measured parallel to the first pivot axis 16 is greater than the corresponding dimension of the link 50.

The link 50 extends out of the support body 34 to a second end 62 spaced from the first end 52. The second end 62 of the link 50, and/or some portion of the link 50 between the first end 52 and second end 62, may be partially overlapped by a support structure, such as a housing or body to which the circuit board 48 is mounted. In at least some implementations, the link 50 is overlapped in a direction parallel to the first pivot axis 16, or otherwise in a direction not parallel to the second pivot axis 28. This limits movement of the link 50 relative to the support structure 34 when the shift lever 12 moves about the second pivot axis 28, which causes the support body 34 to slide relative to the link 50 when the shift lever 12 moves about the second pivot axis. In other words, in at least some implementations, the link 50 is constrained against movement in a direction perpendicular to the second pivot axis 28. Accordingly, the shift lever 12 and support body 34 may move relative to the sensor 46 and circuit board 48, while the second end 62 of the link 50 remains at generally the same distance from the circuit board 48. In at least some implementations, the axis 58 about which the link 50 pivots may be at generally the same distance from the sensor 46 in all positions of the shift lever 12, where generally in this instance means within 3 mm. This limits or eliminates travel of the magnet 44 away from the sensor 46 which would alter and possibly weaken the magnetic field at the sensor 46.

As noted above, the magnet 44 is carried by the link 50, and may be received within a cavity 64 formed in the second end 62 of the link 50. The magnet 44 could be entirely overmolded or otherwise covered by the material of the link 50, or a portion of the magnet 44 may be exposed from the link. In the example shown, a generally planar outer face 66 of the magnet 44 is exposed from the link 50 to facilitate transmission of a suitably strong magnetic field for improved detection by the sensor 46. While the magnet 44 is shown as being generally cylindrical with a circular periphery, other magnet shapes, sizes and arrangements may be used, as desired.

The exposed, outer face 66 of the magnet 44 may be generally parallel to a plane 68 (FIG. 1) containing the path of movement of the magnet 44 when the shift lever 12 moves about the first pivot axis 16, and that plane 68 may be generally parallel to the circuit board 48 and the sensor 46. That is, the plane 68 may be at a constant axial distance (distance measured parallel to the first pivot axis 16) from the sensor 46. Of course, the path or the magnet's outer surface 66 could be arranged other than parallel to the sensor 46 with axial movement toward or away from the sensor 46 defining different positions that can be detected by at least some sensors. Movement of the magnet 44 can be seen by comparison of FIGS. 1 and 5 which show the shift lever 12 in a shift position corresponding to the transmission being in park, with FIGS. 6 and 7 which show the shift lever 12 rotated counterclockwise to a shift position corresponding to the transmission being in drive. In the implementation shown in the drawings, during this pivoting of the shift lever 12 about the first pivot axis 16, the link 50 does not move relative to the support body 34. That is, the link 50 and magnet 44 move with the shift lever 12 among the various positions, and the magnet 44 is in a different position relative to the sensor 46 in each of the various shift positions 22 along the first shift path 24.

However, when the shift lever 12 is pivoted about the second pivot axis 28, such as to move the shift lever 12 to the second shift path 30, the link 50 is constrained against movement in that direction, as noted above. Accordingly, the link 50 does not move or does not move significantly (e.g. by more than 3 mm, and may move less than 2 mm in some implementations and by less than 1 mm in some implementations) relative to the sensor 46 or the plane 68, while the support body 34 is pivoted relative to (i.e. toward or away from) the sensor and plane. During such movement of the support body 34, the support body 34 slides relative to the pin 56 about which the link 50 pivots, and this causes the link 50 to pivot as can been seen by comparison of FIG. 7 with FIG. 9 (e.g. a plane parallel to the outer surface 66 of the magnet 44 is not at the same angle in the positions of the shift lever 12 shown in these figures). The support body 34 may have a drive surface, which may be a surface that defines part of the slot 60, that engages and pivots the link 50 during this shift lever motion. The different positions of the magnet 44, or the movement of the magnet 44 between these positions, may be detectable by the sensor 46, particularly if the sensor is a 3D magnetic sensor. An example of a 3D magnetic sensor which can detect such pivoting movement of a magnet 44 is sold by Melexis, as model MLX90363, of course, other sensors may be used. While not wishing to be held to any particular theory, a 2D magnetic sensor may also be able to reliably detect the pivoted movement of the magnet 44 and with proper calibration of the system, such a sensor may be capable of use with the shift lever assembly 10 described herein.

After pivoting of the shift lever 12 about the second pivot axis 28, the shift lever 12 may be pivoted about the first pivot axis 16 to move among positions 32 in the second shift path 30. Components or retainers (e.g. detents for the follower 42) may be provided to define and/or hold the shift lever 12 in different positions of the second shift path, or the shift lever may be biased, such as by a spring, to return to a center or home position after being pivoted about the first pivot axis 16 such that the shift lever 12 does not remain in the other positions 32 of the second shift path 30. As shown in FIG. 2, the second shift path 30 in at least some implementations, may include a position reached by moving the shift lever 12 in one direction about the first pivot axis 16 from the center position and another position reached by moving the shift lever in the opposite direction from the center position. When the shift lever 12 is moved to these positions, the transmission may be commanded to change gears (e.g. one position corresponds to an upshift to a higher drive gear and the other position corresponds to a downshift to a lower drive gear). When such user commanded shifting among the drive gears is no longer desired, the shift lever 12 can be pivoted about the second pivot axis 28 back to the first shift path 24 for automatic transmission shifting, and to permit movement to other gears, such as neutral, reverse or park gears.

Thus, the magnet 44 may be swung or moved along a path relative to the sensor 46 but in a plane 68 generally parallel to (e.g. at a constant axial distance from) the sensor 46 when the shift lever 12 is pivoted about the first pivot axis 16, and the magnet 44 may be pivoted relative to the plane 68 and sensor 46 when the shift lever 12 is pivoted about the second pivot axis 28. Such movements of the magnet 44 also move its magnetic field which is detectable by the sensor 46 to permit a controller to positively identify the position of the shift lever 12 among the various shift positions of the shift lever.

FIGS. 10-15 illustrate another embodiment of a shift lever assembly 70. This shift lever assembly 70 includes many similar components and features as the assembly 10, and these common components and features will be given the same reference numerals and will not be further described, to facilitate understanding the assembly 70. The assembly 70 may also have a first shift path 24 and a second shift path 30, and correspondingly, the shift lever 12 may be moved about the first pivot axis 16 and second pivot axis 28, as described above. Such movements of the shift lever 12 also move a magnet 44 carried by a link 72 to a different position for each shift position 22, 32, to permit detection of the various shift positions of the shift lever 12.

In this embodiment, the sensor element (e.g. magnet 44) that is movable as the shift lever 12 moves is rotated to a different position in each of the shift positions 22, 32 in both the first shift path 24 and second shift path 30. The magnet 44 may be carried by the link 72 that may be coupled at a first end 74 to the pivot body 15 or a housing or component adjacent to the shift lever 12, such as the housing to which the circuit board 48 and sensor 46 are mounted. The link 72 and magnet 44, in at least some implementations, are coaxial with the first pivot axis 16. As the shift lever 12 is rotated about the first pivot axis 16, the link 72 and magnet 44 rotate about the first pivot axis 16 an angle/amount that may be the same as the angle/amount the shift lever 12 rotates about the first pivot axis 16. Thus, the magnet 44 rotates but does not move laterally toward or away from, or side-to-side relative to and is not pivoted relative to the sensor 46 as the shift lever 12 moves among the shift positions 22 of the first shift path 24.

The assembly 70 may also include a drive member 76 that is associated with the shift lever 12 and with the link 72 to displace the link when the shift lever is moved about the second pivot axis 28. In at least some implementations, the drive member 76 is coupled to otherwise moves with the shift lever 12 when the shift lever rotates about the second pivot axis 28. The drive member 76 and link 72 are arranged so that movement of the drive member 76 relative to the link 72 causes the link to rotate about a drive axis, which may be coaxial with the first pivot axis 16. Thus, movement of the shift lever 12 about the second pivot axis 28 also causes rotation of the magnet 44 relative to the sensor 46. Each rotational position or orientation of the magnet 44 when the shift lever 12 is in the second shift path 30 may be different from the rotational positions of the magnet 44 when the shift lever 12 is in the first shift path 24, so that the magnet 44 is in a different rotational position or orientation in each of the shift positions of the shift lever 12.

In the embodiment shown in the drawings, the drive member 76 is a sleeve that is received around at least part of the link 72, which is cylindrical, and the sleeve 76 is also coaxial with the first pivot axis 16. The sleeve 76 and link 72 may be received within a cylindrical cavity 78 in the pivot body 15. Thus, the sleeve 76 is constrained to move axially within the cavity 78 and relative to the link 72 and pivot body 15. The sleeve 76 and link 72 include cooperating cam features that translate the axial movement of the sleeve 76 to rotary movement of the link 72. One of the sleeve 76 and link 72 may include a cam surface that is not parallel to the path of movement of the sleeve 76, and the other may include a follower that is engaged with the cam surface. In the implementation shown, the cam surface is defined in one or more slots 80 (FIGS. 13-15) formed in the sleeve 76 and the follower is defined by one or more pins or posts 82 extending from the link 72 and received within the slots 80. As the sleeve 76 moves axially, the cam surfaces 80 (e.g. surfaces that define the slots) engage the pins 82 and rotate the link 72, to rotate the magnet 44 carried by the link 72. As shown in the drawings, two sets of cam slots 80 and pins 82 may be diametrically opposed for balance and to facilitate evenly driving the link 72 for rotation.

Figure 15:
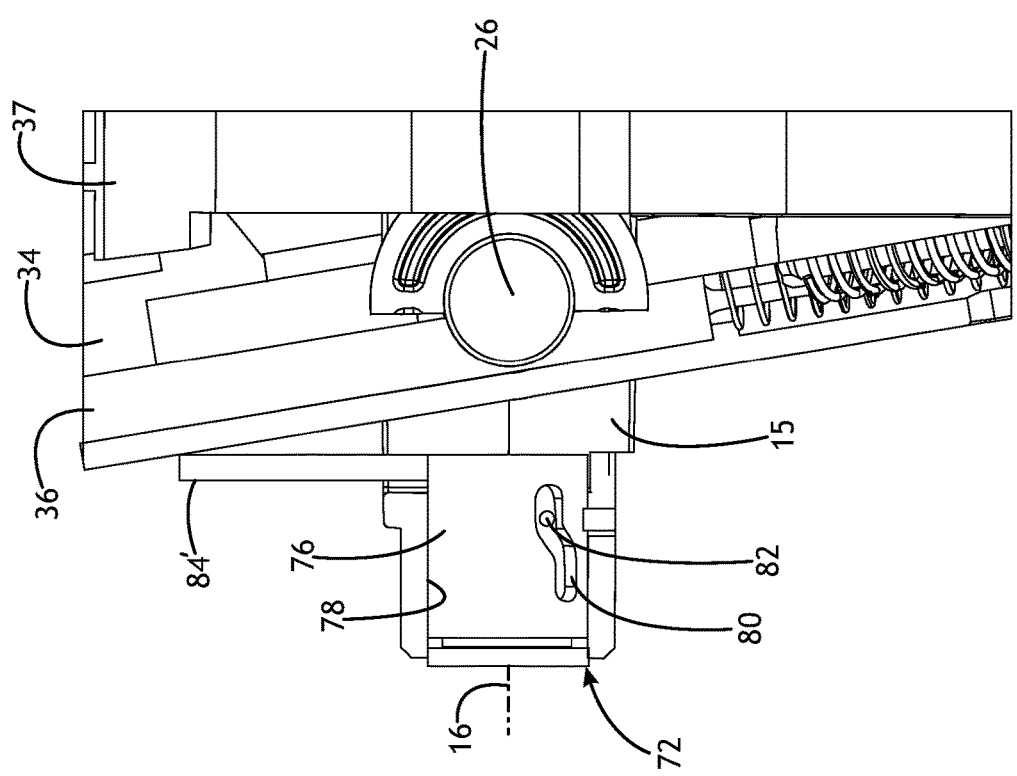
FIG. 15 is a front and partially sectioned view of the assembly including a modified drive member.

In FIGS. 11-14, a drive lever 84 is connected to the shift lever 12 (e.g. the support body 34) and acts on the sleeve 76 to drive the sleeve 76 axially as the shift lever 12 is pivoted about the second pivot axis 28. The drive lever 84 may be coupled to a pivot pin 85 at one end to the support body 34, coupled to a pivot pin 86 mounted to the pivot body 15 between ends of the lever 84, and have a portion 88 that engages the sleeve 76 to cause the desired motion of the sleeve. Alternatively, as shown in FIG. 15, the sleeve 76 may include or be connected to a drive lever 84' that is engaged by the shift lever 12 (e.g. the support body 34 and/or rod 36) as the shift lever 12 pivots about the second pivot axis 28. To return the sleeve 76 and the link 72 to their positions when the shift lever 12 is in the first shift path 24, the sleeve 76 may be biased by a spring 90 (FIG. 12) toward its retracted position so that the spring moves the sleeve as the shift lever is pivoted back to the first shift path. Otherwise, the drive lever 84' could be connected to the shift lever 12 so that the shift lever 12 drives the sleeve 76 in both directions as the shift lever pivots in both directions about the second pivot axis 28. Of course, other arrangements may be used to cause rotation of the link 72 as the shift lever 12 rotates about the second pivot axis 28.

The magnet 44 may have a first position (e.g. rotary orientation) relative to the sensor 46 when the shift lever 12 is in the park position, may rotate a first direction to a second position when the shift lever 12 is moved to the reverse position, and may rotate further in the first direction when the shift lever is moved to the neutral or drive positions. The shift lever 12 may be temporarily moved to the "sport" position by rotating the shift lever 12 further away from park, in the example shown. The shift lever 12 might not stay in this position, but the corresponding rotation of the magnet 44 further in the first direction, compared to the position of the magnet 44 when the shift lever 12 is in the drive position, would be detected by the sensor 46 and a control scheme could then be employed to implement the sport mode of the transmission. Then, when the shift lever 12 is rotated about the second pivot axis 28, the drive member 76 rotates the link 72 and magnet 44 further in the first direction, preferably further in the first direction than is the magnet position when sport mode is actuated (e.g. the magnet 44 is rotated farther than whatever is the last position in the first shift path 24). Movement of the shift lever 12 about the first pivot axis 16 when the shift lever is in the second shift path 30 will also rotate the magnet 44 either further in the first direction or in the second direction, opposite to the first direction. Preferably, the position of the magnet 44 relative to the sensor 46 is different in each shift position 22, 32 of the shift lever 12. However, a controller may be programmed to recognize when the shift lever 12 has moved into and/or out of the second shift path 30, such as by a sensor signal or by a particular signal from the magnet 44 due to the rotation of the magnet 44 caused by the shift lever movement to the second shift path 30. In this way, the magnet positions when the shift lever 12 is in the second shift path 30 may be distinguishable by the controller from the magnet positions in the first shift path 24 without those magnet positions having to be rotationally different than the magnet positions when the shift lever is in the first shift path 24.

Figure 16:
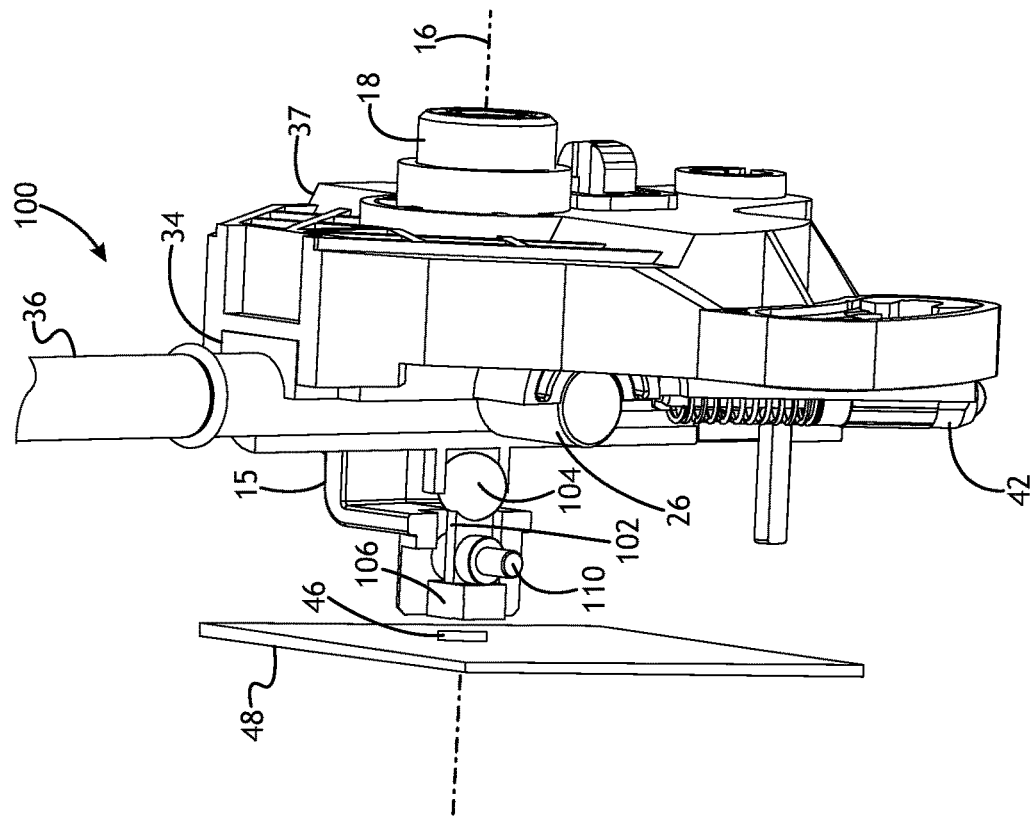
FIG. 16 is a perspective and partially sectioned view of a shift lever assembly.

FIGS. 16-18 illustrate a shift lever assembly 100 that includes many similar components and features as the assemblies 10 and 70, and these common components and features will be given the same reference numerals and will not be further described, to facilitate understanding this assembly 100. The assembly 100 may also have a first shift path 24 and a second shift path 30, and correspondingly, the shift lever 12 may be moved about the first pivot axis 16 and second pivot axis 28, as described above. Such movements of the shift lever 12 also move a magnet 44 carried by a link 102 to a different position for each shift position, to permit detection of the various shift positions of the shift lever 12.

In the shift lever assembly 100, the magnet 100 is carried by the link 102 that is coupled to the pivot body 15, and which is acted upon by the shift lever 12 during at least some movement of the shift lever 12. In the implementation shown, the link 102 has a first end 104 that is received adjacent to a drive surface 105 of the shift lever 12 (e.g. a surface defining a cavity 107 of the support body 34), and a second end 106 spaced from the shift lever. The magnet 44 is arranged at or adjacent to the second end 106, and may be received within and partially exposed from a cavity 108 (FIG. 18) in the link 102. The link 102 is coupled to the pivot body 15 by a pin 110 extending parallel to the second pivot axis 28 which, in this implementation, is perpendicular to the first pivot axis 16. The pin 110 may be received between the ends 104, 106 of the link 102, and the link 102 may pivot about the pin 110, as set forth in more detail below. The magnet 44 and link 102 may be coaxial with the first pivot axis 16 and may rotate with the pivot body 15 and the shift lever 12 as the shift lever is moved about the first pivot axis 16 and along the first shift path 24. That is, there is no or little relative movement between the pivot body 15, shift lever 12 and the link 102 during movement of the shift lever 12 within the first shift path 24. So arranged, the magnet 44 is in a different rotational orientation relative to the sensor 46 in each shift position 22 of the first shift path 24, and an outer surface 66 of the magnet 44 is maintained a consistent distance from the sensor 46. In the implementation shown, the magnet 44 is rectangular (e.g. square) and has a planar outer surface 66 exposed from the link 102 and adjacent to the sensor 46 in use.

When the shift lever 12 is rotated about the second pivot axis 28 to move the shift lever 12 to the second shift path 30, the drive surface 105 engages the first end 104 of the link 102 (or a portion of the link 102 between the first end 104 and the pin 110), as may be seen by comparison of FIGS. 17 and 18. This engagement and movement of the shift lever 12 relative to the link 102 causes the link to pivot or rotate about the pin 110 which moves (e.g. tilts or inclines) the magnet 44 relative to the sensor 46. The change in magnetic field at the sensor 46 is detected by the sensor 46 to enable suitable control of the assembly with respect to the transmission shifting in the second shift path 30. Subsequent movement of the shift lever 12 within the second shift path 30 and about the first pivot axis 16 causes rotation of the magnet 44 about the first pivot axis 16 to permit detection of the change in shift lever position within the second shift path 30. Such changes in position may be relayed to a transmission shift actuator to cause transmission gear changes in the same manner as noted above. When the magnet 44 is coaxial with the first pivot axis 16 when the shift lever 12 is within the first shift path 24, the pivoting of the link 102 when the shift lever 12 moves to the second shift path 30 causes the magnet 44 to no longer be coaxial with the first pivot axis 16. Thus, the subsequent movement of the shift lever 12 about the first pivot axis 16 causes the magnet 44 to rotate and move along an arcuate path relative to the sensor 46 (rather than simply rotate about the axis 16). Thus, the sensor 46 may be arranged or chosen to detect such 3D movement of the sensor, or a 2D sensor may be capable of such detection, in at least some implementations (as noted above).

The shift lever assemblies 10, 70 and 100 each move a magnet 44 to different positions associated with different shift positions of a shift lever 12 which may move within two shift paths 24, 30. The shift lever may move the magnet 44 relative to one or more sensors both when the shift lever moves within a shift path and when the shift lever moves between the shift paths, to enable detection of the various positions to which the shift lever may be moved. The magnet 44 may be rotated about an axis the same as or parallel to a first pivot axis of the shift lever, pivoted about an axis not the same as or parallel to the first pivot axis, or both, to provide the different positions of the magnet.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A vehicle shift lever assembly, comprising:
a shift lever movable about a first pivot axis within a first shift path having multiple shift positions, and movable about a second pivot axis to a second shift path having at least one shift position, and the second pivot axis is not parallel to the first pivot axis; and
a sensor element coupled to the shift lever for movement with the shift lever, the sensor element being oriented in a different position when the shift lever is in each of the shift positions in the first shift path and each of the shift positions of the second shift path, wherein the sensor element is rotated about an axis and the sensor element is in a different rotary orientation in each shift position.

2. The assembly of claim 1 wherein the axis about which the sensor element is rotated is parallel to the pivot axis.

3. The assembly of claim 1 wherein the sensor element is carried by a link and the link and sensor are rotated about a first axis during at least some movement of the shift lever between two of said shift positions, and the link is rotated about a pivot during movement of the shift lever between at least two of said shift positions.

4. The assembly of claim 3 wherein rotation of the link about the pivot is not parallel to the first pivot axis.

5. The assembly of claim 3 wherein the link is rotated about the pivot when the shift lever moves from a shift position in the first path to a shift position in the second path.

6. The assembly of claim 3 wherein the pivot is coupled to the link and to the shift lever and wherein the link pivots relative to the shift lever.

7. The assembly of claim 6 wherein the shift lever engages the link and moves the link about the pivot when the shift lever moves about the second pivot axis.

8. The assembly of claim 3 wherein the pivot is coupled to a mount body to which the shift lever is coupled, and wherein the mount body moves with the shift lever about the first pivot axis and the shift lever moves relative to the mount body about the second pivot axis.

9. The assembly of claim 8 wherein the shift lever engages the link and moves the link about the pivot when the shift lever moves about the second pivot axis.

10. The assembly of claim 3 wherein the shift lever slidably moves relative to the link when the shift lever moves about the second pivot axis.

11. A vehicle shift lever assembly, comprising:
a shift lever movable about a first pivot axis within a first shift path having multiple shift positions, and movable about a second pivot axis to a second shift path having at least one shift position, and the second pivot axis is not parallel to the first pivot axis;
a sensor element coupled to the shift lever for movement with the shift lever, the sensor element being oriented in a different position when the shift lever is in each of the shift positions in the first shift path and each of the shift positions of the second shift path; and
a drive member coupled to the shift lever and a driven member coupled to the sensor element, and wherein movement of the shift lever about the second pivot axis moves the drive member relative to the driven member and rotates the driven member to rotate the sensor element.

12. The assembly of claim 11 wherein the drive member moves relative to the driven member along a drive axis as the shift lever is moved about the second pivot axis, and the sensor element rotates about the drive axis.

13. The assembly of claim 12 wherein the drive axis is coincident with the first pivot axis.

14. A vehicle shift lever assembly, comprising:
a shift lever movable about a first pivot axis within a first shift path having multiple shift positions, and movable about a second pivot axis to a second shift path having at least one shift position, and the second pivot axis is not parallel to the first pivot axis;
a sensor element coupled to the shift lever for movement with the shift lever, the sensor element being oriented in a different position when the shift lever is in each of the shift positions in the first shift path and each of the shift positions of the second shift path;
a sensor element spaced from the shift lever and responsive to movement of the sensor element that is coupled to the shift lever; and
a link coupled to the shift lever and which carries the sensor element that is coupled to the shift lever, and wherein the link is pivoted about an axis that is not parallel to the first pivot axis when the shift lever moves about the second pivot axis.

15. The assembly of claim 14 which also includes a mount body that moves with the shift lever about the first pivot axis, and wherein the shift lever moves relative to the mount body when the shift lever moves about the second pivot axis.

16. The assembly of claim 14 which also includes a circuit board and wherein the sensor element spaced from the shift lever is mounted on the circuit board and wherein the circuit board is mounted perpendicular to the first shift axis.

17. The assembly of claim 16 wherein the sensor element coupled to the shift lever moves in a path that is perpendicular to the first pivot axis when the shift lever moves in the first shift path.

18. The assembly of claim 14 wherein the sensor element coupled to the shift lever is coaxial with the first pivot axis at least when the shift lever is within the first shift path.

* * * * *